June 23, 1970  KAZUO SANO  3,517,232

COOLING MEANS FOR ELECTRICAL MACHINES

Filed Feb. 2, 1968  4 Sheets-Sheet 1

INVENTOR.
Kazuo Sano
BY
George B. Oujevolk
Attorney

June 23, 1970  KAZUO SANO  3,517,232
COOLING MEANS FOR ELECTRICAL MACHINES
Filed Feb. 2, 1968  4 Sheets-Sheet 3

INVENTOR.
Kazuo Sano
BY George B. Aufroll
attorney

United States Patent Office 3,517,232
Patented June 23, 1970

---

3,517,232
COOLING MEANS FOR ELECTRICAL MACHINES
Kazuo Sano, Yokohama-shi, Japan, assignor to Tokyo Shibaura Electric Co., Ltd., Kawasaki-shi, Japan, a corporation of Japan
Filed Feb. 2, 1968, Ser. No. 702,560
Claims priority, application Japan, Feb. 6, 1967, 42/7,290, 42/7,291; Mar. 9, 1967, 42/14,449; Apr. 26, 1967, 42/26,301; May 17, 1967, 42/30,835; Dec. 26, 1967, 42/82,963
Int. Cl. H02k 3/24
U.S. Cl. 310—59  9 Claims

ABSTRACT OF THE DISCLOSURE

In a dynamoelectric machine or an induction regulator coils contained in slots of a magnetic core of the stator and/or rotor are secured in position by means of wedge means which are arranged to permit portions of the coils contained in the slots to be exposed to a cooling medium.

---

This invention relates to dynamoelectric machines such as induction machines, synchronous machines, direct current machines, alternating current commutator machines and induction voltage regulators and similar electric machines and apparatus and more particularly to such machines and apparatus including wedges arranged to improve cooling effect for conductors contained in stator and/or rotor cores.

As is well known in the art, electric machines and apparatus such as dynamoelectric machines and induction voltage regulators having a construction similar to wound type induction motor have a stator and a rotor spaced therefrom by an air gap. During operation of these machines the temperature thereof increases owing to the flow of current through the windings and the capacity of the machine is mainly determined by such temperature rise, so that sufficient cooling should be provided to prevent or limit the temperature rise to increase the capacity of the machine. In other words, by increasing the cooling effect the physical size of the machine could be reduced for the same capacity, thus decreasing the cost of manufacturing.

Usually, the stator of dynamoelectric machine, for example an induction motor, comprises a stator core made up of a plurality of laminated iron sheets having a number of slots along the periphery of the core to receive electric coils. According to conventional design, wedges made of wood, cotton, paper or glass fibre, treated with synthetic resin, are inserted in the openings of the slots to prevent coils disposed therein from dislodging under the operation of the machine, or when used in the rotor, under the action of centrifugal force created by the rotation of the rotor. Since the purpose of the wedges is to prevent dislodging of coils, wedges are driven into the slots throughout the entire axial length of the slots. Such a construction, however, greatly diminishes heat dissipation from coils because wedges are made of resin or wood having poor heat conductivity. Thus, in the dynamoelectric machine of the type outlined above, heat in the coils facing the air gap is dissipated mainly through the surface of teeth between slots. The surface of upper coils adjacent the wedges are liable to be heated more strongly than the lower coils located in deeper portions of the slots due to skin loss, no load eddy current loss and the like. It is obvious that covering the surface of upper coils with wedges of poor heat conductivity results in the reduction in the cooling effect of the coils.

It is therefore an object of this invention to provide electric machines and apparatus having an improved cooling effect.

A further object of this invention is to save the number of wedges required and hence to save labour involved in driving them into slots.

According to this invention, wedges are driven into slots with suitable spacings or gaps therebetween instead of end-to-end abutting relationship or each wedge has a wide portion and a narrow portion so as to leave portions of the surface of coils contained in the slots in direct contact with cooling gas such as air or hydrogen.

The invention can be more fully understood from the following detailed description when taken in connection with the accompanying drawings in which.

Figure 1:
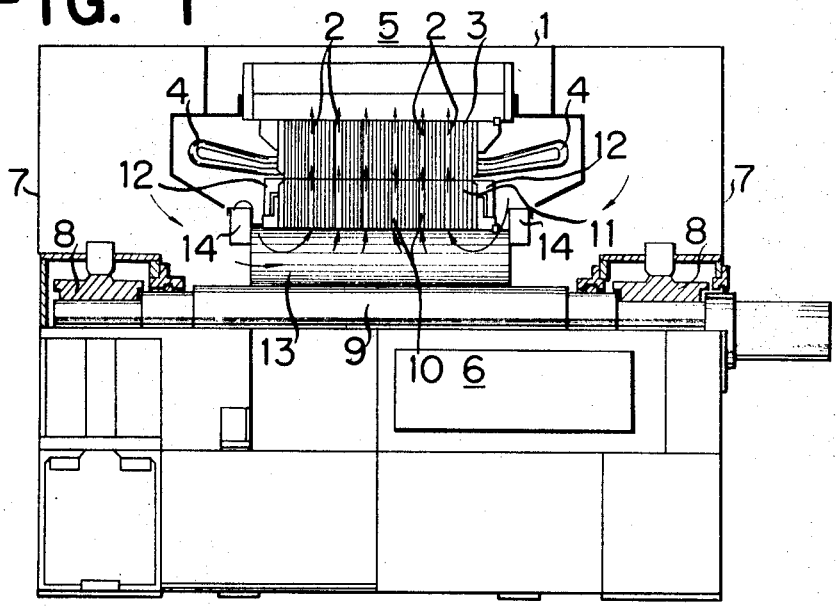
FIG. 1 is a longitudinal sectional view of a dynamoelectric machine embodying this invention.

Referring now to the accompanying drawings, FIG. 1 shows a longitudinal sectional view of an induction motor as an example of the dynamoelectric machine. Inside a frame 1 is secured a stator core 3 comprising a plurality of laminated thin iron sheets with radial air or ventilation ducts 2 at predetermined spacings. Usual stator coils 4 are disposed in slots of the stator core 3 to complete a stator 5.

A rotor 6 is spaced from the stator by an annular air gap and comprises a rotor core 11 made of a plurality of laminated thin iron sheets with spaced radial air gaps, a shaft 9 journalled by bearings 8 supported by end brackets 7 secured to the opposite ends of the frame 1, and rotor conductors 12 disposed in the slots of the rotor core 11.

Cooling of stator 5 and rotor 6 is provided by circulating air through the air duct 10 in the rotor core 11 and through the air duct 2 in the stator core 3 in the direction shown by arrows by air circulating fans 14 secured on both sides of the rotor rim 13.

The invention is characterised by the arrangement of wedges which securely hold the stator coils 4 in stator slots.

Figure 2:
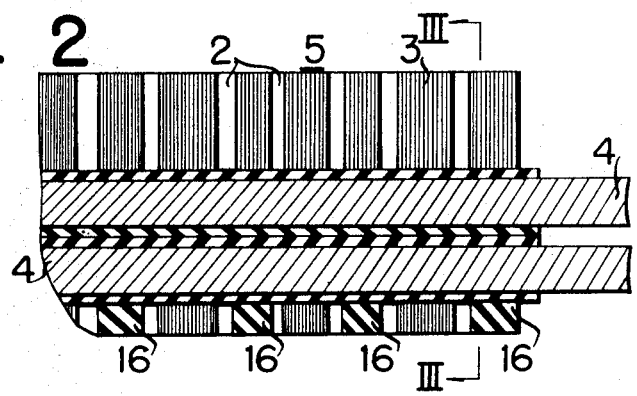
FIG. 2 is an enlarged side view of the stator shown in FIG. 1.
Figure 3:
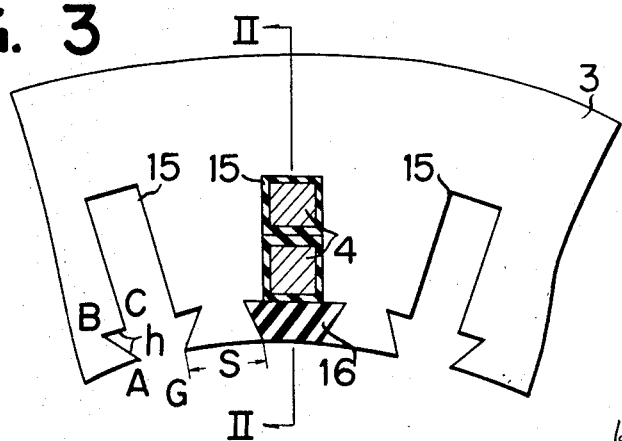
FIG. 3 shows a section of the stator taken along a line III—III in FIG. 2.

More particularly, as schematically shown in FIGS. 2 and 3, stator coils 4 provided with ground insulations are contained in the slots 15 of the stator core 3. After insertion of stator coils, wedges 16 having a configuration and dimensions as shown in FIG. 3 are driven into the openings of the slots 15. According to this invention, wedges 16 are located with suitable gaps therebetween instead of being driven in end-to-end abutting relationship throughout the axial length of the slots, as has been the usual practice.

Figure 4:
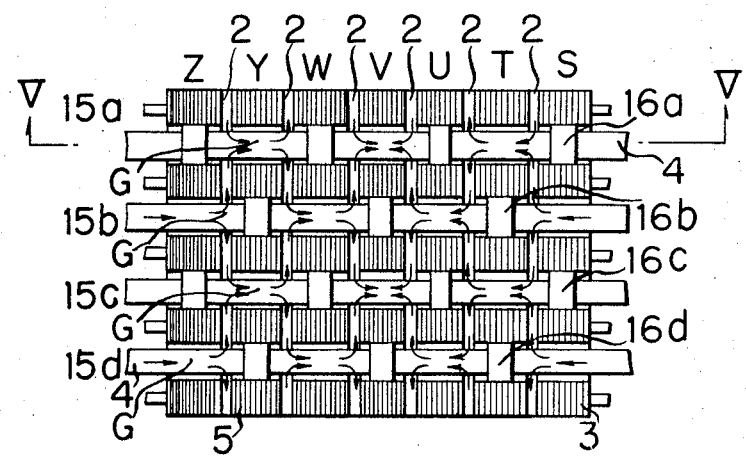
FIG. 4 is a developmental view of the stator.

FIG. 4 shows a modified arrangement of wedges for a stator core 3 comprising a plurality of sections S, T, U, V, W, Y and Z separated by air ducts 2. In the uppermost slot 15a, wedges 16a are driven into core sections S, U, W and Z, while in the next slot 15b wedges 16b are driven into core sections T, V and Y. In the third slot 15c wedges 16c are driven into core sections S, U, W and Z, while in the lowermost slot 15d wedges 16d are driven into core sections T, V and Y.

With this arrangement, each gap G between adjacent wedges driven into slots 15a through 15d to clamp the upper surface of respective coils contained therein communicates with two air ducts and wedges in adjacent slots are staggered in the axial direction.

Air ducts 2 are defined by interposing suitable spacers between laminations of sections S, T, U, V, W, X and Y when they are stacked in frame 1. To communicate gaps G of adjacent slots the air ducts 2 are not required to extend between the inner and outer peripheries of the core but may be defined by cutting away teeth of the core to an appropriate depth from the air gap.

In this manner, by driving wedges into core slots with suitable gaps G therebetween, the surface of coils 4 is brought into direct contact with cooling gas in the gaps G, thus greatly improving the cooling effect of the machine. According to the ordinary design the opened end of each slot 15 is formed to have a dove-tail shaped cross-section to receive the wedge so that the sum $h$ of the lengths AB and BC is substantially larger than the length AC or the radial thickness $h$ of the wedge. Assuming now that the peripheral width $s$ of the core 3 equals to 10 mm., that the thickness of the wedge 16 equals to 3.5 mm. and that $h \doteq 5$ mm., then the surface area $S_0$ of the core contributing to cooling could be expressed by an equation $S_0 = (S+2h)/s = (10+2 \times 5)/10 = 2$ at portions where there is no wedge, thus increasing the effective area by two times. If it is assumed that the total length of portions of the slot that do not contain a wedge amounts to ⅔ of the axial length of the slot the surface area of the core contributing to cooling would be increased by a factor of 1.7.

Further, by the arrangement shown in FIG. 4, the surfaces of the coil between wedges 16a, 16b, 16c and 16d which are driven into respective slots 15a, 15b, 15c and 15d of the stator core 3 are exposed to the air gaps G, each communicating with two air ducts 2. Therefore, cooling gas sent by fans 14, shown in FIG. 1, will enter into slots 15b and 15d, and thence flow to gaps G in each slot through air ducts 2 as indicated by arrow in FIG. 4. Thus, the cooling gas effectively cools not only the coils in the slots but also portions of the slots which do not contain wedges whereby the cooling effect of the stator can be greatly improved.

When the invention was applied to a 450 kw., 3,600 r.p.m. squirrel-cage type induction motor the quantity of air passing through air ducts was increased about three times and the temperature rise of the coil was decreased from 76° C. to 68° C.

Figure 5:
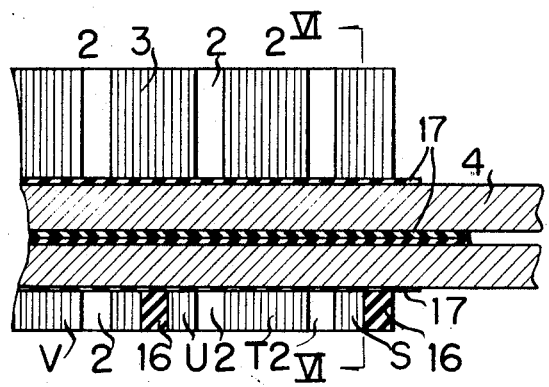
FIG. 5 shows a section of the stator taken along a line V—V in FIG. 4.

In the embodiment shown in FIG. 4, as each coil 4 is secured in position by spaced apart short wedges 16, when the ground insulation of the coil is relatively soft the wedges will thrust into the ground insulation to damage it. In the embodiment shown in FIG. 5 this tendency is eliminated by interposing a thin sheet of insulator 17, made of glass fibre treated with synthetic resin for example, and having a thickness of about 0.3 to 0.8 mm., between the coil 4 and wedges 16. Since the insulator 17 has a large mechanical strength damage thereof at the time of driving the wedges can be prevented. Further, by bonding wedges 16 to insulator 17 by means of a suitable binder dislodging thereof can be precluded. Further, as the thickness of the insulator 17 is small, about 0.3 to 0.8 mm. for example, heat conduction from the coil 4 is not precluded thus preserving enhanced cooling effect afforded by air gaps not covered by wedges 16.

Figure 6:
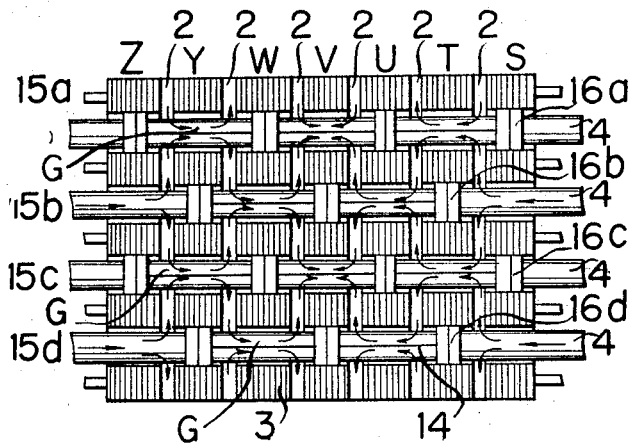
FIG. 6 shows a modification of the embodiment shown in FIG. 4.
Figure 7:
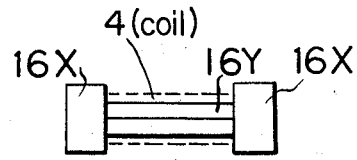
FIG. 7 shows a plan view of a wedge embodying this invention.

In another embodiment shown in FIG. 6 improved wedges over those shown in FIG. 4 are employed. The same reference characters are used for corresponding portions to eliminate repeated description. As shown in FIG. 7, each wedge employed in this modification is provided with wide end portions 16X and an intermediate portion 16Y narrower than the width of the coil 4. In this embodiment, however, wedges are driven in end-to-end abutting relationship to form a continuous body. Cooling gas through air ducts 2 can flow into the spaces between sidewalls of each slot and the narrow portion 16Y thus increasing the cooling effect for the core 3 and coils 4. In this embodiment as wedges are held in abutting relationship, their axial movements can be precluded.

Figure 8:
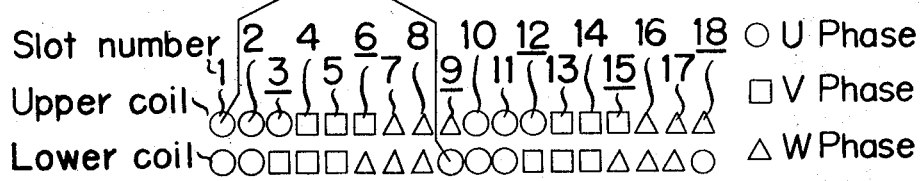
FIG. 8 shows a diagram to illustrate an arrangement of two layered coils.

FIG. 8 is a diagram to show one example of the arrangement of various phase conductors wherein two layered coils consisting of upper and lower coils are disposed in each slot 15 of the stator core 3. This diagram shows the arrangement for a three-phase two pole machine having 18 slots wherein slot numbers per pole per phase $q=3$, and pitch equals to 1—9 or $$\frac{9-1}{9} = 88.9\%$$

Circles, triangles and squares represent phase coils of U, V and W phases respectively. As can be readily understood from the drawings, in slots 3, 6, 9, 12, 15 and 18 are received upper and lower coils belonging to different phases whereas in other slots upper and lower coils belonging to the same phase. In slots containing upper and lower coils belonging to the same phase, as current flows through these coils always in the same direction, these upper and lower coils attract each other to urge them against the bottom of the slot. Thus there is no force tending to force out wedges. On the contrary, in slots containing coils of different phases, during the period in which current flows in the opposite direction through upper and lower coils, a repulsion force will be created between these coils to force out the upper coil together with wedges. If the wedges are not strong enough to withstand this force they would be dislodged. Further clearance between the wedge and the coil will result in the vibration of the upper coil thus causing such fault as dislodging of the wedges and damage to insulation.

Figure 9:
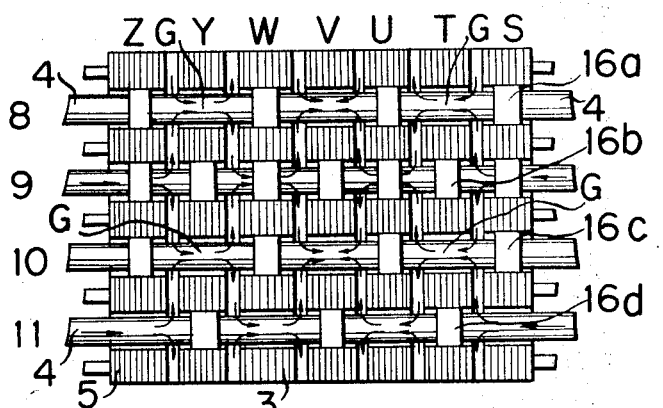
FIG. 9 is a developmental view of a portion of the stator of a dynamoelectric machine employing two layered coils.

In the arrangement shown in FIG. 9, the spacings between adjacent wedges 16 are made small for slots 15 containing upper and lower coils 4 belonging to different phases but large for slots containing coils of the same phase. Considering slot number 9 containing upper and lower coils belonging to different phases wedges 16b are driven in each of core sections S, T, U, V, W, Y and Z whereas wedges 16a, 16c and 16d are driven in other slots 8, 10 and 11 respectively, each containing coils belonging to the same phase, said wedges being spaced by appropriate gaps which serve to expose portions of the surface of coils to increase their cooling effect. The gaps between wedges driven in slots containing coils belonging to different phases are reduced to prevent dislodging of coils due to repulsive force.

Figure 10:
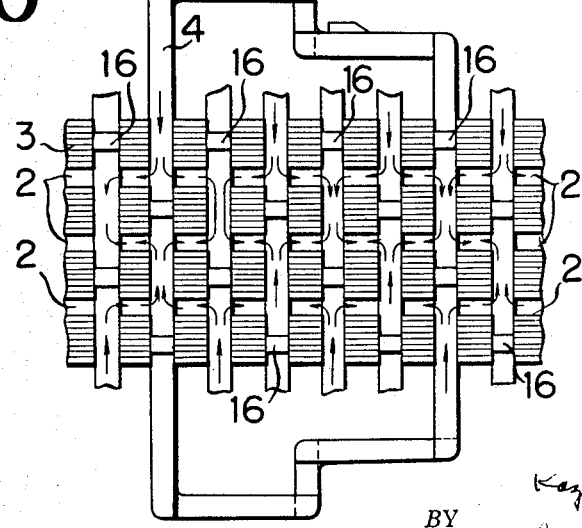
FIG. 10 is a developmental view of a portion of the stator of a dynamoelectric machine employing one layered coil.

FIG. 10 shows an embodiment of this invention wherein slots 15 of a stator core 3 contain one layered coils 4. In a dynameolelectric machine with one layered coils, as current always flows in the same direction through coils contained in all slots, coils are normally urged against the bottom of the slots. Thus there is no force created by current tending to force out coils. For this reason, wedges 16 driven into slots are not required to have a strong strength and the spacings between them may be increased to expose larger area of the coils to cooling gas thus increasing the cooling effect.

Figure 11:
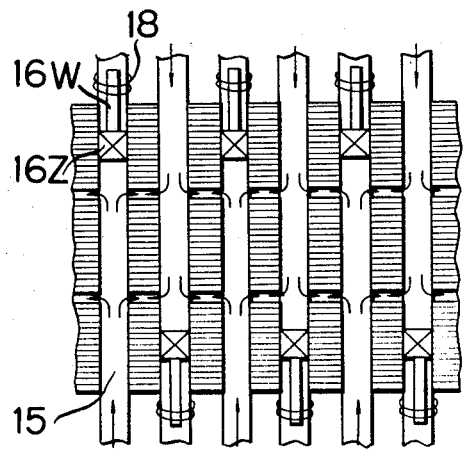
FIGS. 11 and 12 are partial developmental views of stators employing another arrangements of wedges.
Figure 12:
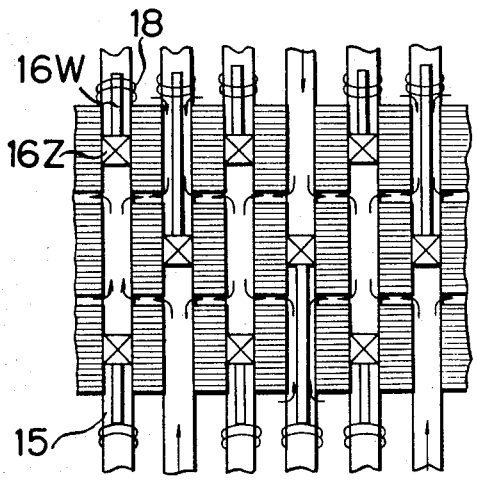

FIGS. 11 and 12 illustrate two similar modifications of this invention utilising wedges 16 each comprising a wide section 16Z and a narrow section 16W. Narrow section 16W of each wedge is protruded out of the core 3 where it is clamped to the coil 4 by a cord 18 to prevent the wedge from dislodging.

What is claimed is:

1. An electric machine comprising a stator component, a rotor component spaced from said stator component by an air gap, at least one of said components including a magnetic core which has slots and a spaced radial ventilation duct; coils contained in said slots; a plurality of wedges inserted into the opening of said slots to secure said coils, said wedges being so spaced and disposed in the axial direction so as to permit the surface of the coil to be exposed as to form passages through which a cooling medium flows while keeping contact with the surface of the coil and said wedges being disposed in end-to-end abutting relationship with one another.

2. An electric machine according to claim 1 wherein said core with slots has a plurality of spaced radial ventilation ducts, a plurality of wedges are driven in said slots in spaced apart relationship so as not to close said ventilation ducts, and the wedges in adjacent slots are staggered with respect to each other in the axial direction.

3. An electric machine according to claim 1 wherein two layered coils consisting of upper and lower coils are contained in the slots of said core, and the wedges driven in the slots containing coils belonging to the same phase are spaced relatively widely whereas wedges driven in slots containing coils belonging to different phases are spaced relatively closely.

4. An electric machine according to claim 1 wherein coils contained in the slots of said core are one layered coils which are secured in position by spaced wedges driven in the openings of said slots.

5. An electric machine comprising a stator component, a rotor component spaced from said stator component by an air gap, at least one of said components including a magnetic core which has slots and a plurality of spaced radial ventilation ducts; coils contained in said slots; a plurality of wedges inserted into the opening of said slots to secure said coils, each of said wedges having a wide and a narrow portions, the width of said narrow portion being narrower than that of a coil so as to permit the surface of the coil to be exposed, axially abutting ducts communicating to one another through gap portions produced between sides of said slots and said narrow portion of the wedges inserted into the slots, said wedges being so spaced and disposed in the axial direction as to form passages through which a cooling medium flows while keeping contact with the surface of the coil and said wedges being disposed in end-to-end abutting relationship with one another.

6. An electric machine according to claim 5 wherein the narrow portion of each of said wedges has such a length as to cover two of said ducts.

7. An electric machine according to claim 5 wherein each one of said wedges driven in said slots includes a wide portion and a narrow portion and are disposed in end-to-end abutting relationship with each other.

8. An electric machine according to claim 7 wherein said narrow portion of said wedge protrudes outside said core and is secured to the coil.

9. An electric machine comprising a stator component, a rotor component spaced from said stator component by an air gap, at least one of said components including a magnetic core which has slots and a plurality of spaced radial ventilation ducts; coils contained in said slots; a plurality of wedges inserted into the opening of said slots to secure said coils, axially abutting ducts communicating to one another, said wedges being so spaced so as to permit the surface of said coil to be exposed, and disposed in the axial direction as to form passages through which a cooling medium flows while keeping contact with the surface of the coil and said wedges being disposed in end-to-end abutting relationship with one another.

References Cited

UNITED STATES PATENTS

| | | | |
|---|---|---|---|
| 838,605 | 12/1906 | Behrend | 310—65 |
| 879,949 | 2/1908 | Dunn | 310—214 |
| 1,268,020 | 5/1918 | Kuyser | 310—65 X |
| 1,311,854 | 7/1919 | Bijur | 310—214 X |
| 2,569,278 | 9/1951 | Barth | 310—214 X |
| 2,723,358 | 11/1955 | Holmgren | 310—214 |
| 3,157,940 | 11/1964 | Underwood | 310—214 X |

D. F. DUGGAN, Primary Examiner

U.S. Cl. X.R.

310—61, 214